Dec. 15, 1936.  B. A. WITTKUHNS ET AL  2,064,454
VARIABLE SPEED MOTOR CONTROL
Filed June 30, 1931    3 Sheets-Sheet 1

INVENTORS
BRUNO A. WITTKUHNS &
FREDERIC M. WATKINS.
BY Herbert A. Thompson
ATTORNEY.

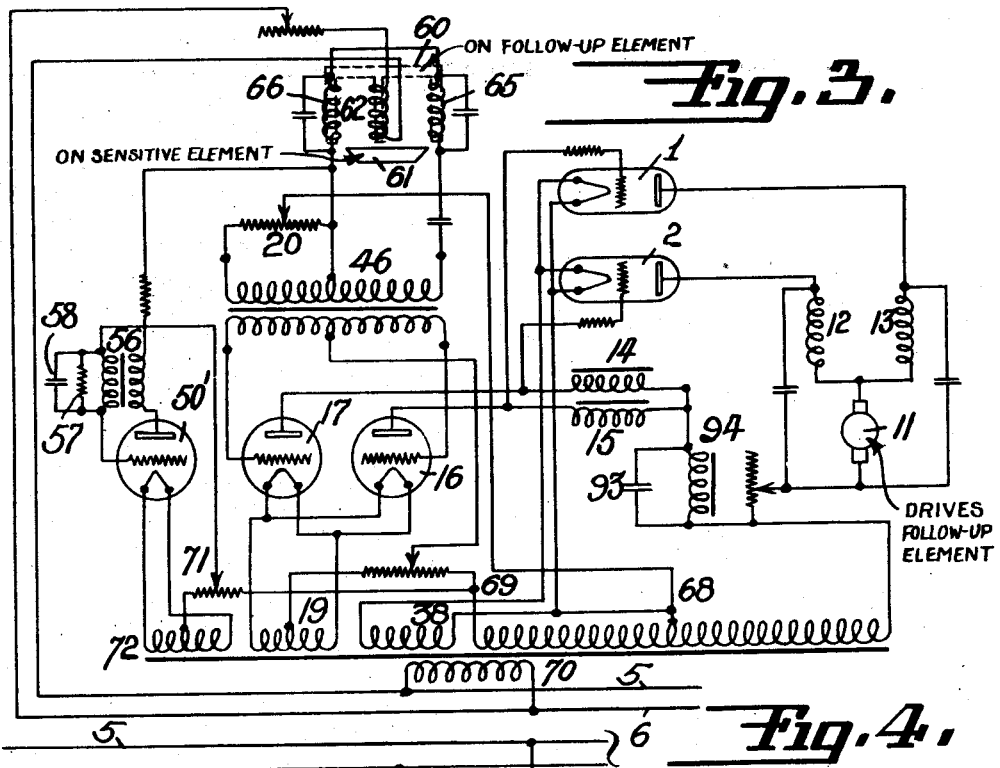
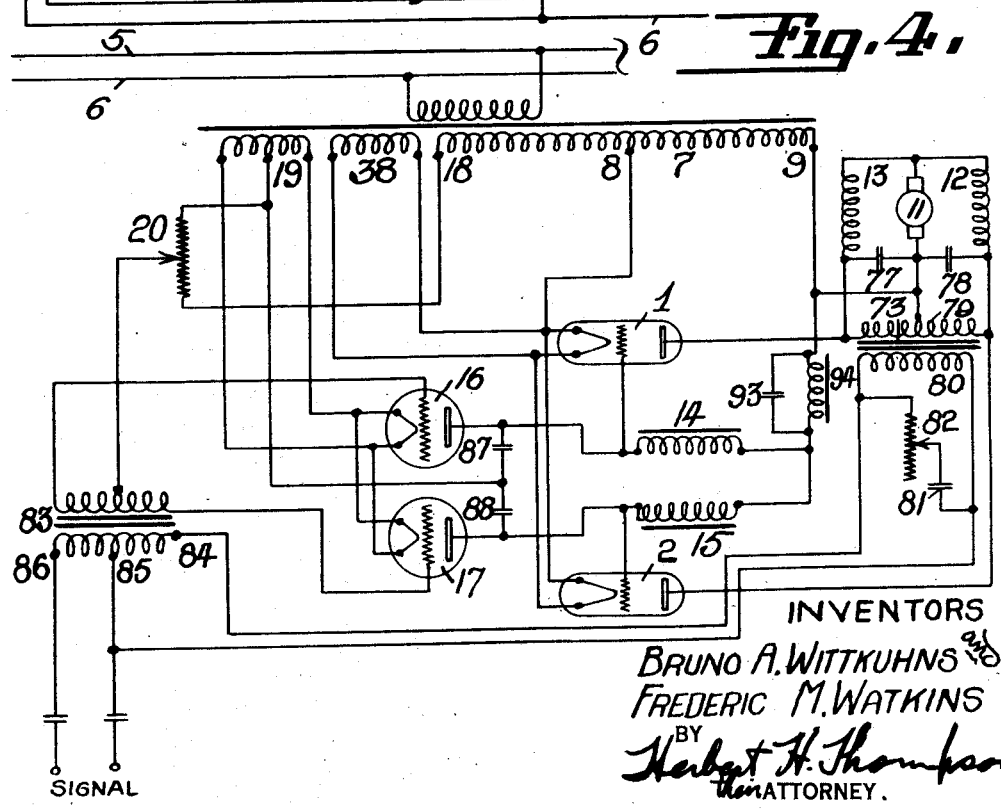

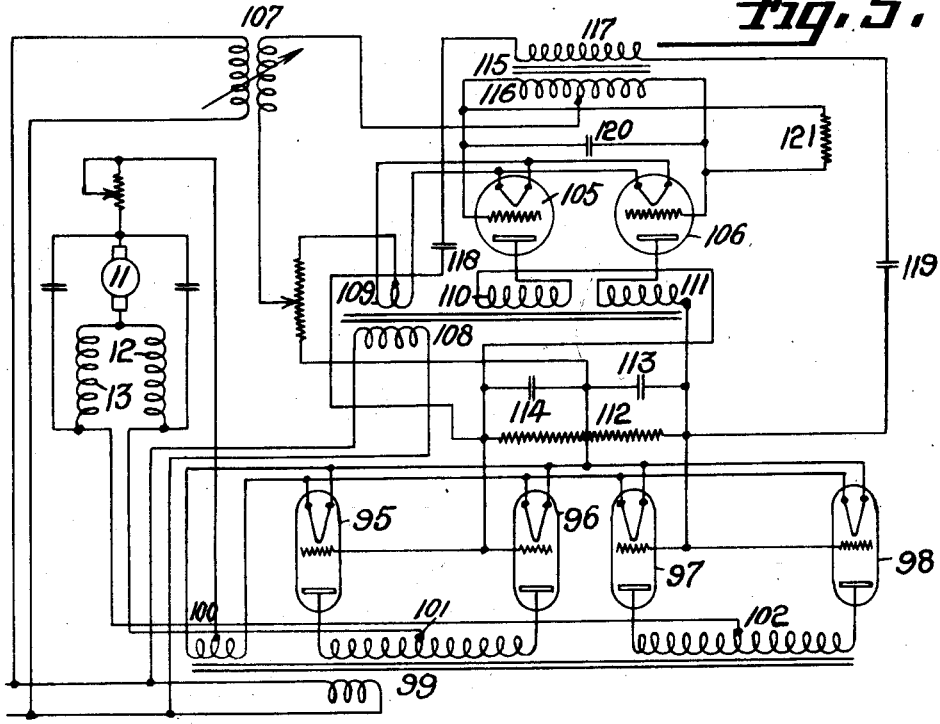

Patented Dec. 15, 1936

2,064,454

UNITED STATES PATENT OFFICE 2,064,454

VARIABLE SPEED MOTOR CONTROL

Bruno A. Wittkuhns, Chatham, N. J., and Frederic M. Watkins, Forest Hills, N. Y., assignors to Sperry Gyroscope Company, Inc., Brooklyn, N. Y., a corporation of New York Application June 30, 1931, Serial No. 547,872

16 Claims. (Cl. 172—239)

This invention relates to motor control by means of grid controlled gas or vapor filled rectifier tubes. These tubes are also known as hot cathode grid controlled rectifiers or simply as grid glow tubes. While the general appearance of these tubes seems to be more or less like those of three-element thermionic tubes, there is a decided difference in their control. Inasmuch as special means have to be provided to interrupt the D. C. plate current, which otherwise, after the tube has once started, would no longer be subject to the control of the grid, it is in most cases advisable to use A. C. for the plate supply, or, if D. C. is used, provide means to interrupt this D. C. if the tube has to be stopped. The great advantage of these tubes, however, is the possibility of controlling comparatively large amounts of power by means of very small input energies. They, therefore, are excellently suited for use as relays, with the added advantage of no moving parts whatsoever.

In the present invention, these tubes are used to control power driven motors, especially in such cases where the motors not only have to be stopped and started but where they also have to be reversed. Furthermore, this invention relates to the use of such motors in all kinds of apparatus where the controlling element is not able to supply appreciable amounts of either mechanical or electrical energy, as, for instance, in follow-up arrangements for sensitive devices such as gyro compasses, magnetic compasses, and for remote control systems, and the like.

In the accompanying drawings,

Fig. 3 shows another modification of the same circuit as applied to a follow-up system.

Fig. 4 shows a simplified modification of the circuit in Fig. 3.

Fig. 5 shows another circuit for the same general purpose in which the control of the rectifier tubes is different.

Figure 1:
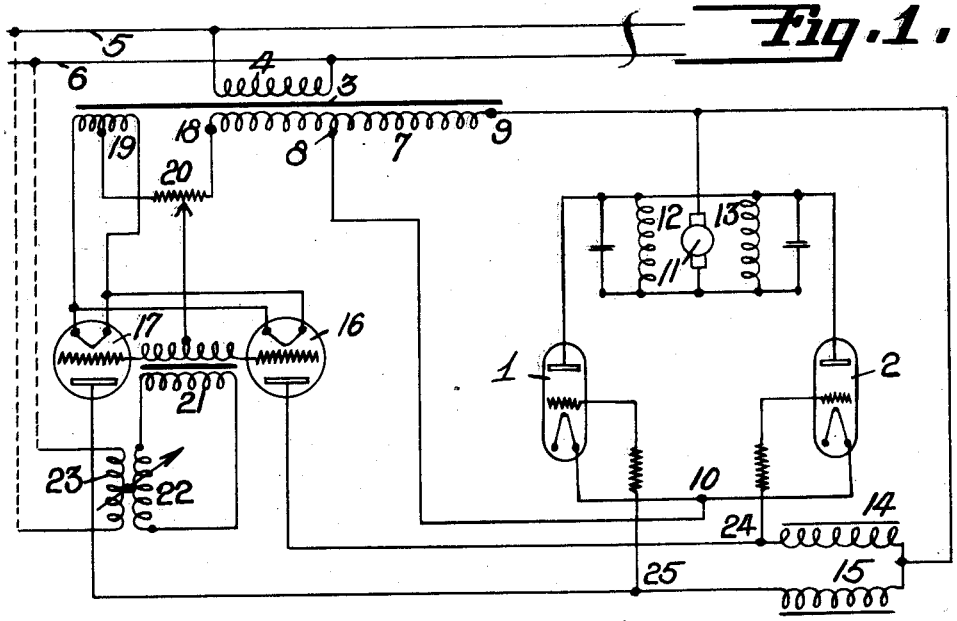
Fig. 1 shows by a wiring diagram the general scheme of a rectifier controlled reversing motor.
Figure 2:
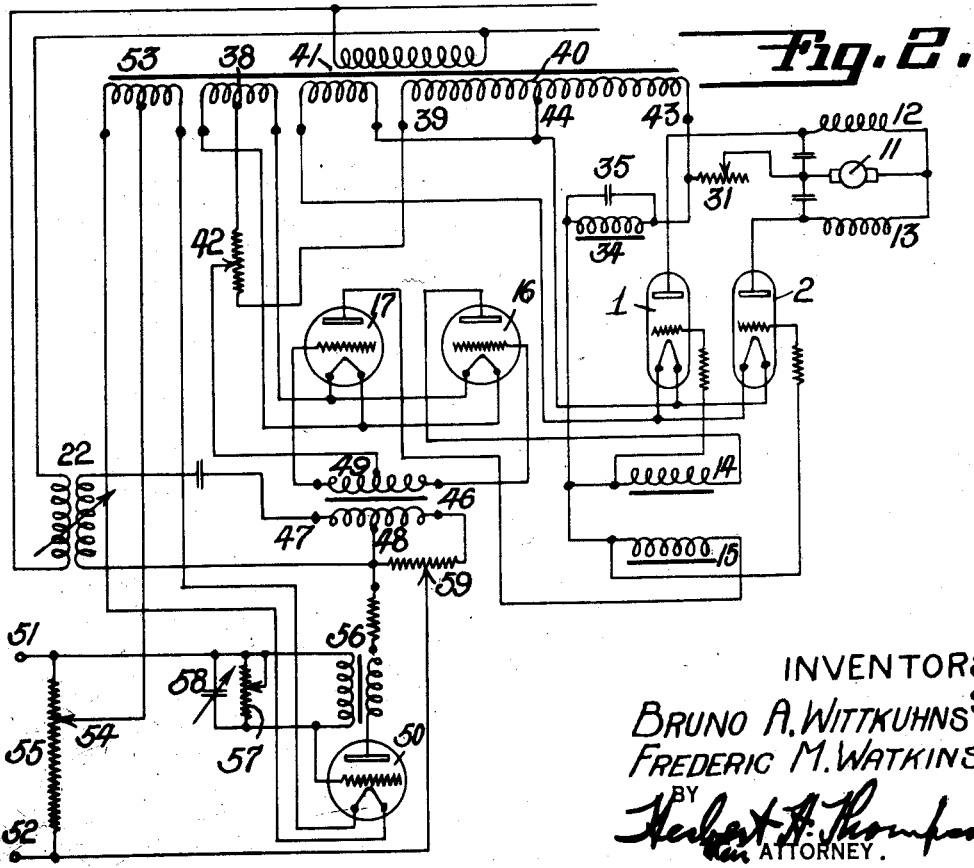
Fig. 2 shows a modification of the same circuit for higher sensitivity and accuracy.

Referring to Fig. 1, 1 and 2 are two grid glow tubes constituting what may be termed a grid glow or rectifier tube unit, in which the usual plate, grid and filament are shown in the conventional manner. No filament heating supply is shown in this circuit for the sake of simplicity. A transformer 3 is provided to supply the necessary voltages to the whole apparatus. The primary 4 of the transformer is connected to an alternating current line 5 and 6. The high tension secondary 7 of this transformer has a center tap 8. Between the end 9 of this winding and the center tap 8 exists a potential which is used for the plate supply of the rectifiers 1 and 2. Point 8 is connected to the connection 10 of the filaments of the tubes, while from point 9 the circuit goes through the armature 11 of a power motor and through the field coils 12 and 13 of the same motor. From there the connection goes to the plates of the tubes. The action of this part of the circuit is such that the current passing through tube 1 will pass through the armature and field coil 12 of the motor, while current passing through tube 2 will pass through armature 11 and field coil 13 of the motor. The field coils are arranged in such a way that the current through tube 1 will drive the motor in one direction, while the current through tube 2 will drive it in the reverse direction. The tubes 1 and 2 have to be controlled in such a way that while the motor is supposed to stand still the current through both tubes is equal or zero. If the motor has to run one way, the current in one tube should be larger than in the other one, and, if it is desired to reverse the motor, the quantity of current through the tubes should be reversed. We show the following means for this control of the tubes.

14 and 15 are two equal chokes joined at one end which in turn is connected to point 9 of the secondary of transformer 3. Two thermionic valves 16 and 17 are connected in such a way between points 18 and 9 of transformer 3 that their plate current has to pass through chokes 14 and 15. A filament winding 19 provides heating current for the filaments of tubes 16 and 17 and has its center tap connected to point 18 of the secondary 7 through potentiometer 20, the slide of which takes off the necessary grid bias for tubes 16 and 17. The grids of tubes 16 and 17 are controlled through transformer 21, the secondary of which is center tapped and connected to the filament of the tubes. The primary of the transformer 21 is connected to the secondary of the transformer 22, which constitutes the input device. The primary 23 of this transformer is shown connected by dotted lines to the supply lines 5 and 6; it carries A. C. in phase with the A. C. potential on coil 7. If coil 23 is turned around so that its axis is vertical to that of the winding 22, no transfer of energy will be effected. If, however, coil 23 is in any position but vertical, then A. C. of equal phase relation, but with its amplitude proportional to the sine of the angle between the two axes of the coils, will be induced in coil 22. It can readily be seen that the potential induced in 22 will either be zero or in phase or in opposite phase with that in coil 23. In other words, if the vertical position between the two axes is taken as the balance or zero point, turning coil 23 clockwise will produce a potential in phase with 7, while turning counter-clockwise will produce a potential of opposite phase.

Suppose that the axis of 23 and 22 is parallel at one given moment in such relation that the phase of 22 is in phase with that of the supply. Then the transformer 21, in its secondary, will produce an A. C. potential which will make the grid of tube 17 to be of opposite potential compared with that of tube 16, because the center point of the coil is connected to the filaments. If we assume that the grid in tube 17 is positive, this tube will pass a comparatively large plate current, while tube 16, due to its negative grid, will pass a comparatively small plate current. Both these plate circuits naturally will only pass current during the positive half-cycle of the A. C. potential generated in winding 7. If we turn coil 23 through an arc of 180°, we thereby reverse the grid potentials on tubes 16 and 17. Tube 17 will now have a negative grid, while that of tube 16 is positive. Therefore, tube 17 now passes a small plate current and tube 16 passes a high plate current. These plate currents pass through the chokes 14 and 15. It is a well known fact that by passing current through a choke the phase relation of the A. C. network is changed. In our case, one end of choke 14 is connected to the grid of rectifier tube 2 and the corresponding end of choke 15 is connected to the grid of rectifier tube 1. Both filaments are connected to the center point 8 of winding 7, while the current through the chokes passes from point 9 through the chokes, through the tubes to point 18. The potential between point 24 and point 8, which is nothing else but the grid potential on grid 2, is always equal to the potential between 8 and 9, or 8 and 18. It will be in phase with 8—9 if there is no current passing through choke 14 and it will be in phase with 8—18 if the internal resistance of tube 16 is zero. It is obvious that by selecting the proper kind of tubes, or, instead of tubes, resistance, it is possible to swing the vector of the potential between 8 and 24 through the full 180° from 8—9 to 8—18.

Due to the properties of the grid glow tubes, the output current of such tubes can be controlled by such a change of phase of the grid voltage. Once the grid voltage gets positive enough to allow the plate current to start, it will continue to pass current until the plate voltage has completed its present positive half-cycle. By shifting the phase of the grid voltage, one can select the time during the positive half-cycle at which the plate current will start to flow. If the grid voltage is in phase opposition to the plate voltage, the tube cannot pass any current, as during the full half-cycle the grid voltage will be negative. As soon, however, as the grid voltage is shifted slightly to a lagging position, the current will start during the last fraction of the positive half-cycle. In other words, the average plate current will be very small. By making the grid voltage vector lag more and more, one can gradually and continuously change the average plate current from zero to its maximum.

The action of the tubes 16 and 17 in this invention is such as to change the phases of the grid voltage vectors with respect to the plate voltage vectors by allowing more or less current to flow through the chokes 14 and 15 as they are active during the same half-cycle as the rectifiers. The more current flows, the more will the grid vector be in opposition to the phase vector and tend to stop the current flow through the rectifiers. If coil 23 is in the zero position, the plate currents through tubes 16 and 17 and also the currents through chokes 14 and 15 are equal. At this point, therefore, the output current of the rectifier tubes is also equal. The value of this current can be regulated within wide limits by selecting the working point on the characteristic of the vacuum tubes 16 and 17. Preferably, the vacuum tubes are operated with a very small negative grid bias so as to make the initial plate current rather high. Thereby, the grid vector of the rectifier tubes is moved to a point nearly in opposition to the plate vector and the output current is small.

As soon as coil 23 is moved out of its zero position to one side, the plate or choke current in one branch will be higher, while the similar current in the other branch will be smaller than before. Thereby, the grid vector of one rectifier is moved to a position more lagging, while the corresponding vector of the other rectifier is moved to a less lagging position. One rectifier, therefore, will pass more current than the other one with the result that the motor will run in the desired direction. In order to reverse the motor, it is necessary to move coil 23 back through the zero point to the other side, thereby shifting the phases of the grid voltages of the rectifier tubes in the opposite sense than before, which results in a reversal of the motor.

While this circuit will control the motor with excellent results as long as it is heavily loaded and enough friction is present to prevent the motor from hunting in its zero position, it is not sufficient for positive motor control in all such cases where the motor is employed in a follow-up system. To make a follow-up system out of the circuit shown in Fig. 1, it is only necessary to provide a direct or geared connection between the shaft of the armature 11 of the power motor and the pivot point of coil 22, which might be mounted so that it can be turned around an axis vertical to the axis of the coil. Also, coil 23 might be pivoted on another axis in line with that of the pivot of coil 22. Coil 23 might be located on the sensitive element of a gyro compass or other compass, or on the pivot of a delicate measuring instrument, the motions of which have to be followed and translated into power. If the coils are in their respective zero positions, which means that coil 23 is standing still and coil 22 has reached a position in which the coil axis is vertical to that of 23, the inertia of the gears and the motor armature will make the motor hunt around the zero position, as such sensitive arrangements cannot tolerate any friction on the motor-driven parts. The only way to make the motor stop at the point is to make both rectifier tubes stop entirely at that point, which means that their grid vectors would have to be in full opposition to the plate vector. However, such an arrangement has grave disadvantages. It is necessary to select a working point on the vacuum tubes 16 and 17 near the break of the curve in order to get enough current through the same to stop the rectifiers. This means that in order to reduce the initial plate current sufficiently to make the tubes start, an appreciable angle of motion would have to take place on coil 23 before this can be accomplished. It, therefore, is obvious that there will be quite a wide "dead spot" through which the coil 23 can move without the motor 11 making the coil 22 follow coil 23. If coil 23 should be in continuous motion, this dead spot will mean that coil 22 will follow coil 23 with an appreciable "lag."

Our present invention has successfully overcome this disadvantage by making both rectifier tubes pass an appreciable percentage of their maximum current in the zero position and by preventing the motor from breaking into a hunt. It will be obvious that in such a case the differential action between the two plate currents of the rectifiers will provide a very sharp zero point and a very small lag on following.

Fig. 2 shows a system of the general character as Fig. 1, in which this has been accomplished. Rectifier tubes 1 and 2 are placed in the circuit in much the same way as in Fig. 1. They feed the motor field coils 12 and 13 through the armature 11 and a series resistance 31, while their grid voltage vector is controlled by the chokes 14 and 15. An additional choke 34 is provided together with a condenser 35 across the choke, the choke being in series with the two chokes 14 and 15 respectively. The vacuum tubes 16 and 17 receive their plate current through the chokes 34, 14 and 15, and their filaments, through the mid tap of heating coil 38, are connected to point 39 of the winding 40 of transformer 41. In series with this connection is the potentiometer 42 which allows the adjustment of the grid bias for tubes 16 and 17. The plate potential for these tubes is supplied between points 39 and 43 of winding 40, while the winding between 43 and 44 provides plate supply for the rectifier tubes.

The input device is shown in the same schematic way as in Fig. 1, consisting of an adjustable transformer 22, the secondary of which is connected to one half of the primary of transformer 46. It is shown connected between points 47 and 48, the latter being the mid tap of that winding. The secondary 49 of transformer 46 splits the signal up in its usual way and gives the grids of tubes 16 and 17 opposite potentials. So far, this circuit is very much the same as in Fig. 1 with the exception of choke 34 which serves the purpose of fixing the starting point around which the grid vectors of the rectifier tubes are swinging. It thereby allows a wider variation of the grid bias of the vacuum tubes and a finer control of the working point on those tubes.

The principal movement of this circuit is that a special oscillator tube 50 is provided to impart a certain kind of oscillation to the vacuum tubes. As will be seen from the diagram, the tube 50 is supplied with a D. C. plate potential from the terminals 51 and 52, while its filament is heated from the winding 53 on transformer 41. The slider 54 across the potentiometer 55 permits a change in the relative value of grid and plate voltage for tube 50. A transformer 56 has one winding in the plate circuit of tube 50 and another winding in its grid circuit, this winding being paralleled by resistor 57 and condenser 58. This arrangement makes tube 50 a self-starting oscillator of which the frequency can be adjusted by changing the value of condenser 58 and the amplitude of which can be adjusted by changing resistor 57. The oscillations pass through the plate circuit of tube 50 which also includes potentiometer 59. By moving the slider across this potentiometer, the amplitude of the oscillations getting into the primary of transformer 46 can be controlled. In other words, if the slider is moved to the right, the oscillations will be at their maximum, while if it is moved to the left they will approach zero, or no oscillations will get through to transformer 46. The oscillations, which preferably are selected around a frequency of between 10 to 60 per second, will be transmitted to the grid of the vacuum tubes, and these tubes will oscillate at the same frequency. The oscillations produce periodic changes on the plate currents of these tubes in such a way that while the plate current through one tube is swinging up the current through the other one swings down. It is obvious that these oscillations will periodically change the current through the chokes 14 and 15 and thereby make the grid voltage vectors for the rectifiers vibrate around their zero position in such a way that while one swings to a more lagging position the other one swings to a less lagging position. The result is that the output currents of the rectifier tubes are periodically changing at the same frequency, which causes the armature 11 of the motor to oscillate back and forth at the same predetermined frequency.

If we again assume that the motor is connected to the input transformer 22 in such a way as to constitute a follow-up system, the oscillations of the motor will be mechanically transmitted to the transformer 22, which in turn will transmit the mechanical vibrations in form of electrical fluctuations back into the circuit where the same process starts all over again. Once the oscillation is started, it takes only a fraction of a second to reach its minimum at which it will stay continuously. It must be understood, however, that these oscillations in no way interfere with the normal signal transmitted through the input device 22. If a misalignment between the coils occurs, it will cause the motor to follow the other coil in just the same way as if no oscillations were introduced into the motor. The main feature of the oscillations, however, is that they interrupt the plate current flow often enough to prevent the building up of a hunting action on the motor. This continuous and periodic interruption will also prevent any sudden surges of current through the motor and thereby will make the follow-up system exceptionally stable. Experience has shown that an oscillating rectifier controlled motor will follow its controlling element within very close limits, which, in most cases, are considerably below one minute of arc.

Fig. 3 shows the same general arrangement as Fig. 1 and Fig. 2 with the exception that the input system shown is that of a follow-up control transformer, as shown in our previous application, now Patent #1,959,804, dated May 22, 1934. The three-legged transformer core 60 is mounted on the follow-up element which is driven directly or by gears from the shaft of the armature 11, of the power motor. The control armature 61 of the transformer core 60 is mounted on the sensitive element, the motions of which have to be reproduced by the follow-up system. 62 is the primary of this transformer which is supplied with A. C. from the A. C. mains 5 and 6. The secondaries 65 and 66, which are tuned to the particular frequency of the supply system, are arranged and connected in such a way that their respective potentials are equal and in opposition to each other on the zero point. If the armature 61 moves off towards one side, the potential of one coil will prevail; if it moves off to the other side, the potential of the other coil will prevail. Therefore, the output of this device would have the same characteristics as those shown as 22 in Figs. 1 and 2. The input transformer 46 and the arrangement of the vacuum tubes as well as the chokes and the grid glow tubes, together with the motor, are identical to those shown before. The only difference is the oscillator tube 50' which is here shown as an A. C. supplied oscillator. Its plate voltage is provided between the points 68 and 69 of the transformer 70. The grid bias is provided by the potentiometer 71 which is connected between the mid point of the heater winding 72 and point 69 of transformer 70. The performance of this circuit is identical to that shown in Fig. 2.

Fig. 4 shows an improved circuit in which the oscillator tube has been eliminated. We provide a special transformer 73 which is connected with one winding across the two field coils 12 and 13 of the motor 11. The condensers 77 and 78, which are also shown in the preceding figures and which are provided to minimize the effect of self-induction of the coils 12 and 13 also tune the winding 79 of transformer 73, each half of the winding being tuned by one of the condensers. Coil 80 of transformer 73 is tuned by condenser 81 which is in series with rheostat 82. This rheostat serves the purpose of changing phase, frequency and amplitude of the oscillations which are started in this transformer and make tubes 16 and 17 oscillate. The output of coil 80 is connected to one half of the input transformer 83 between points 84 and 85. The signal input is connected between points 85 and 86. Of further importance are the very small condensers 87 and 88 which are shown connected between the plates and filaments of the vacuum tubes 16 and 17. These condensers at the same time connect the grids of the rectifiers 1 and 2. There are several possible explanations for the action of these condensers. The most plausible one seems to be that they provide a path of A. C. through the chokes while the vacuum tubes 16 and 17 have negative plate voltage and are inactive. In other words, these condensers allow a more continuous flow of A. C. through the chokes instead of only rectified A. C. like in the other circuits shown. Of further importance is the size of the condenser 93 across choke coil 94 which is in series with the control chokes. Changing this condenser results in a change of frequency of the oscillations set up in the system by means of transformer 73.

It is possible to arrest the motor shaft so that the same cannot move at all and still the current surges of the electrical oscillations will continue to tug at the motor, which can be proved by measuring instruments in the motor leads. In other words, what is set up in the circuit is an electrical oscillation and its effect on the motor is not to be confused with a fast hunt. A hunt, no matter how fast, can always be stopped mechanically by stopping the motor. An electrical oscillation, resulting in a mechanical vibration of the motor, cannot be stopped at all, except by opening certain connections in the circuit. The transformer 73 has another very important function. It prevents any hunting of the motor even if the oscillations are made extremely small and of high frequency. As soon as the oscillations become small enough they will have very little effect on surges through the motor or on the inertia of the system. However, the reverse feed back action of transformer 73 will prevent the building up of a hunting action at the beginning. For small signals, the transformer 73 is acting strong enough against the tendency to hunt to overcome the same completely. On strong signals, however, the normal feed back action in the circuit prevails, resulting in very high torque of the motor for very small misalignment of the control system. No special input system is shown in Fig. 4 as it is obvious that any of those shown in Figs 1, 2 and 3 can be used with equal results.

Fig. 5 shows a circuit which is radically different in the way the rectifiers are controlled, but which has the same feature of a self-generated oscillation within the system to prevent hunting action and to increase accuracy. The rectifiers 95, 96, 97 and 98 are here not controlled progressively by shifting the phase of the grid voltage but suddenly by changing the magnitude of the grid voltage. It is, therefore, obvious that it is only possible to make the tubes go full on or full off, but that no intermediate position can be secured. Right on the face of this it will be clear that such a system must of necessity be a hunting system on account of the violent surges of current every time a tube is started. The rectifiers are here employed in full wave rectifying circuits so that the current supplied to the motor is for all practical purposes pure D. C. The circuit, however, will work just as well with two tubes instead of four if the tubes are employed in half wave circuits. This is likewise true for the preceding circuits in which full wave arrangements could be used instead of half-wave by employing two tubes on opposite ends of a transformer winding and controlling their grid voltage through a transformer, which would make the grid vectors of each pair of rectifiers opposite.

In Fig. 5 transformer 99 has three secondary windings 100, 101 and 102. Winding 100 provides filament energy for the rectifiers; winding 101 is a center tapped plate supply winding for rectifiers 95 and 96; while 102 is a similar winding for rectifiers 97 and 98. The output current of the rectifiers goes from the center tap of winding 100 through the motor armature 11 and then through the motor field coils 12 and 13 back to the center taps of windings 101 and 102, respectively, and from there through the tubes to the filaments. The control for the grid voltage of these taps is achieved by means of two vacuum tubes 105 and 106, which in turn are controlled from a conventional input system 107 which acts in identical way as explained before. The plate supply for the tubes 105 and 106 is secured from transformer 108, which has a secondary winding 109 to supply filament energy to the tubes and two separate plate supply windings 110 and 111. One of each of the windings 110 and 111 is connected to one each of the plates of the tubes 105 and 106. Between the other ends of the two windings is connected a center tapped resistor 112, the center tap of which is connected to the filament of the rectifier tubes. It is obvious that a signal will affect both grids of the tubes 105 and 106 equally, while their plates are of opposite potential. This means that these tubes act in a push-pull fashion The plate currents of the tubes have to pass through one half each of the resistor 112. The condensers 113 and 114 are connected across the resistor 112 so that the rectified A. C. voltage drop across each half of the resistors is filtered to such an extent that it is D. C. for practical purposes. As will be seen in the diagram, the free ends of the resistor are connected to the grids of each pair of rectifier tubes respectively. Therefore, if a voltage drop in one half of the resistor occurs, it will change the grid voltage level on the respective pair of rectifiers. Inasmuch as the vacuum tubes 105 and 106 work in opposition to each other, the rectifiers are also controlled in opposition, which means that while one pair of tubes passes current the other pair of tubes is inactive, thereby making the motor respond to whatever input signal is introduced. As said before, this arrangement will make the motor hunt because of the sudden impulse of current caused by the full on or off control of the rectifiers.

In order to suppress the hunting action, we provide a transformer 115 which acts as hunt suppressor and which also makes the vacuum tubes oscillate in a similar way as explained in Fig. 4. The winding 116 of the transformer is center tapped, the center tap being connected to the input transformer 107. To the ends of the winding 116 we connect the grids of tubes 105 and 106. The other winding 117 is connected through condensers 118 and 119 to the ends of the resistor 112. It is obvious that any voltage drop across the resistor 112 will cause a corresponding voltage drop across the coil 117. The A. C. component of this voltage drop will be transmitted to the grids of the tubes 105 and 106. It is seen, therefore, that the tubes will oscillate as one coil of the transformer is in the grid circuits while the other one is in the plate circuits. The tuning is accomplished by condenser 120 which is across winding 116, while the amplitude of the oscillation is limited by the parallel resistor 121. The oscillations cause periodic voltage drops across resistor 112 thereby changing the grid potentials on the gas filled tubes at the same frequency, which in turn results in a similar oscillation of the motor shaft. If a signal is transmitted through the input device, these oscillations will have a higher amplitude in one pair of rectifiers than in the other pair, and the motor will follow the signal just as if the oscillations were not present at all. The hunt suppressing action is similar to that explained for Fig. 4. To a certain extent the oscillations themselves will prevent the hunt by interrupting the continuous flow of current through the motor in just the same way as shown in Fig. 2 where there was no hunt-suppressing device but only an oscillator.

By our system we control a reversing motor by means of grid controlled rectifiers in such a way that the normal tendency of the motor to hunt is prevented by either oscillations or a hunt-suppressing device or by both. The greatest advantage of such an arrangement is that there will be no dead spot if the circuit is used for a follow-up system. The increase in accuracy is quite large and enables the follow-up system to work with very small lag without sacrificing either torque or sensitivity.

Furthermore, the introduction of oscillations right into the motor provides an excellent means of keeping all mechanical parts in continuous motion, thereby eliminating any static friction. In other words, it is not necessary to provide an excessive amount of power to break the parts loose to start them. They are in a continuously starting condition at all times.

The combination of the just mentioned features makes our system very well adapted to such apparatus where extreme accuracy has to be coupled with high torque and sensitivity.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a remote control for power motors, the combination with a reversible commutator motor, of a pair of grid-glow tubes having their plates connected to drive the motor in opposite directions, a transformer controller, a pair of vacuum tubes controlled by said controller, an inductance in circuit with each vacuum tube, each grid-glow tube having its grid connected to a point between each vacuum tube and its inductance, and a common A. C. supply for all said tubes and said controller whereby changes in the position of the controller governs the direction and torque of the motor by shifting the phase of the grid voltage with respect to that of the plate of the glow tubes.

2. In a remote control for power motors, the combination with a reversible commutator motor, of a pair of grid-glow tubes having their plates connected to drive the motor in opposite directions, a transformer controller, a pair of vacuum tubes, controlled by said controller, an inductance in circuit with each vacuum tube, each grid-glow tube having its grid connected to a point between each vacuum tube and its inductance, a common A. C. supply for all said tubes and said controller, and an oscillator in said circuit for preventing hunting of the motor without producing a dead region.

3. In a positional or follow-up control system for power motors for positioning an object with respect to the position of a controlling object, the combination with the controlling object and a controlled object driven therefrom, of means for producing an electro-motive force varying in magnitude and direction with the position of said controlled object, a pair of grid-glow tubes, phase-shifting devices between said means and said glow tubes variable with the output of said means, an A. C. supply for said tubes, a reversible motor for driving said controlled object and governed as to direction and torque by the output of said grid-glow tubes, and an oscillator in said system for preventing hunting of said motor without producing a dead region.

4. In a positional or follow-up control for power motors for positioning an object with respect to the position of a controlling object, the combination with the controlling object and a controlled object driven therefrom, of means for producing an electro-motive force varying in magnitude and direction with the position of said controlled object, a grid-glow tube unit, the output of which is governed from said means, a reversible power motor for driving said controlled object and controlled as to movement and torque from said output, and an oscillator for rapidly and alternately interrupting the plate current flow through said unit to prevent a hunt from building up by causing a rapid small amplitude tremor.

5. In a positional or follow-up control for power motors for positioning an object with respect to the position of a controlling object, the combination with the controlling object and a controlled object driven therefrom, of means for producing an electro-motive force varying in magnitude and direction with the position of said controlled object, a reversible motor for driving the controlled object, and means for causing said motor to follow the movements of the controlling object within close limits without appreciable hunting including a grid-glow tube unit and means of causing the same to continuously and oppositely oscillate.

6. In a follow-up system for sensitive instruments, the combination with a sensitive and a following element, of a grid-glow tube relay amplifying system, means controlled by relative movement of the sensitive and follow-up elements for governing the input to said system, a motor governed by the output of said system for driving said following element, and a feed back means in said system for preventing mechanical hunting of the said motor.

7. In a follow-up system for sensitive instruments, the combination with a sensitive and a following element, of a grid-glow tube relay amplifying system, means controlled by relative movement of the sensitive and follow-up elements for governing the input to said system, a motor governed by the output of said system for driving said following element, a normal feedback means, and an auxiliary feed-back transformer for opposing the building up of hunt-producing surges.

8. In an electrical follow-up system, a two-part controller mounted on the sensitive and follow-up elements wherein relative movement between such parts in one direction or the other creates an output of opposite phase, a grid-glow tube system controlled by such output, a motor controlled from the output of said system, and means for setting up in said system an oscillation of the proper frequency to set up tremors of small amplitude in said motor and follow-up system.

9. In a remote control system for reversible motors, an alternating current supply, a controller excited therefrom, a grid-glow tube amplifying system connected thereto, a multi-wound transformer powered from said supply for supplying filament, plate and grid potentials thereto, a motor connected to the output of said system, and an oscillatory transformer connected between the output of the system and the input to maintain an electrical oscillation and oppose hunting of said motor.

10. In a remote control system for reversible motors, an alternating current supply, a controller excited therefrom, a grid-glow tube amplifying system connected thereto, a multi-wound transformer powered from said supply for supplying filament, plate and grid potentials thereto, a motor connected to the output of said system, said circuit having feed back characteristics, a feed back or bucking transformer and condensers connected in the output of the system, and means for tuning the transformer condenser circuit to produce electrical oscillations in said tubes and motor.

11. In a remote control system for reversible motors, the combination with the motor, of an alternating current supply, a controller excited therefrom, a grid-glow tube amplifying system connected thereto, a multi-wound transformer powered from said supply for supplying filament, plate and grid potentials thereto, a pair of windings controlling the direction of said motor, a multi-wound transformer having one part of its primary across one of said windings and another part across the other winding, a condenser across each part, the secondary winding having a feed back connection to the input, a condenser and variable resistor across said secondary, said motor being controlled by the output of said system.

12. In a remote control for power motors, the combination with the motor, of a pair of grid-glow tubes having their plates connected to drive the motor in opposite directions, a transformer controller, a pair of vacuum tubes and inductances controlled by said controller and having their output connected to the respective grid-glow tubes, a condenser between the plate and filament of each tube, a pair of windings controlling the direction of said motor, a multi-wound transformer having one part of its primary across one of said windings and another part across the motor winding, a condenser across each part, the secondary winding having a feed back connection to the input, and a condenser and variable resistor across said secondary.

13. In a remote control for power motors, the combination with a double wound motor, of a pair of grid-glow tubes having their plates connected to drive the motor in opposite directions, a transformer controller, a pair of vacuum tubes and inductances controlled by said controller and having their output connected to the respective grid-glow tubes, a third inductance shunted by a condenser in circuit with the common of said other inductances and the plate supply of the vacuum tubes, a multi-wound transformer having one part of its primary across one motor winding and another part across the other motor winding, a condenser across each part, the secondary winding having a feed back connection to the input, and a condenser and variable resistor across said secondary.

14. Means for substantially eliminating mechanical hunt and lag in reversible power driven follow-up systems employing an electron tube amplifier for the control of the output of a grid-glow tube rectifier, comprising a plurality of feedback circuits, at least one of which includes means to produce adjustable electrical oscillations and hunt-opposing characteristics in the electron tube amplifier, thereby periodically starting and stopping the output of said glow tube rectifier in opposition at the frequency of said oscillations and means for reproducing these electrical oscillations as mechanical oscillations in the power motor.

15. Means for substantially eliminating static friction, mechanical hunt and lag in a reversible power driven follow-up system employing an alternating current power supply and vacuum tube amplifier system for controlling the output of a grid-glow tube system driving the reversible motor, comprising means for creating within said system and means for superimposing on the supply and signal frequency an oscillation of a frequency low enough to produce in the motor armature a mechanical oscillation of relatively small amplitude.

16. In a positional or follow-up control for power motors for positioning an object with respect to the position of a controlling object, the combination with an A. C. supply, a controller energized therefrom and adapted to produce a signal which varies in magnitude and direction as the position of the controlled and controlling object changes, a pair of oppositely connected electron tubes governed by said controller, an inductance in circuit with each tube, a mid-tapped transformer connected across said tubes and inductances, a pair of grid-glow tubes, each having its filament connected to the center tap of said transformer and its grid to a point between one of said electron tubes and its inductance, and a reversible commutator motor connected to the plates of said glow-tubes whereby its torque and direction are governed by the relative position of the controlling and controlled elements.

BRUNO A. WITTKUHNS.
FREDERIC M. WATKINS.